May 1, 1962 L. A. THORSON 3,031,881
APPARATUS FOR MEASURING CARBON POTENTIAL
Filed Dec. 24, 1958 4 Sheets-Sheet 3

INVENTOR
Lloyd A. Thorson
By Carlson, Pitzner, Hubbard & Wolfe
ATTORNEY

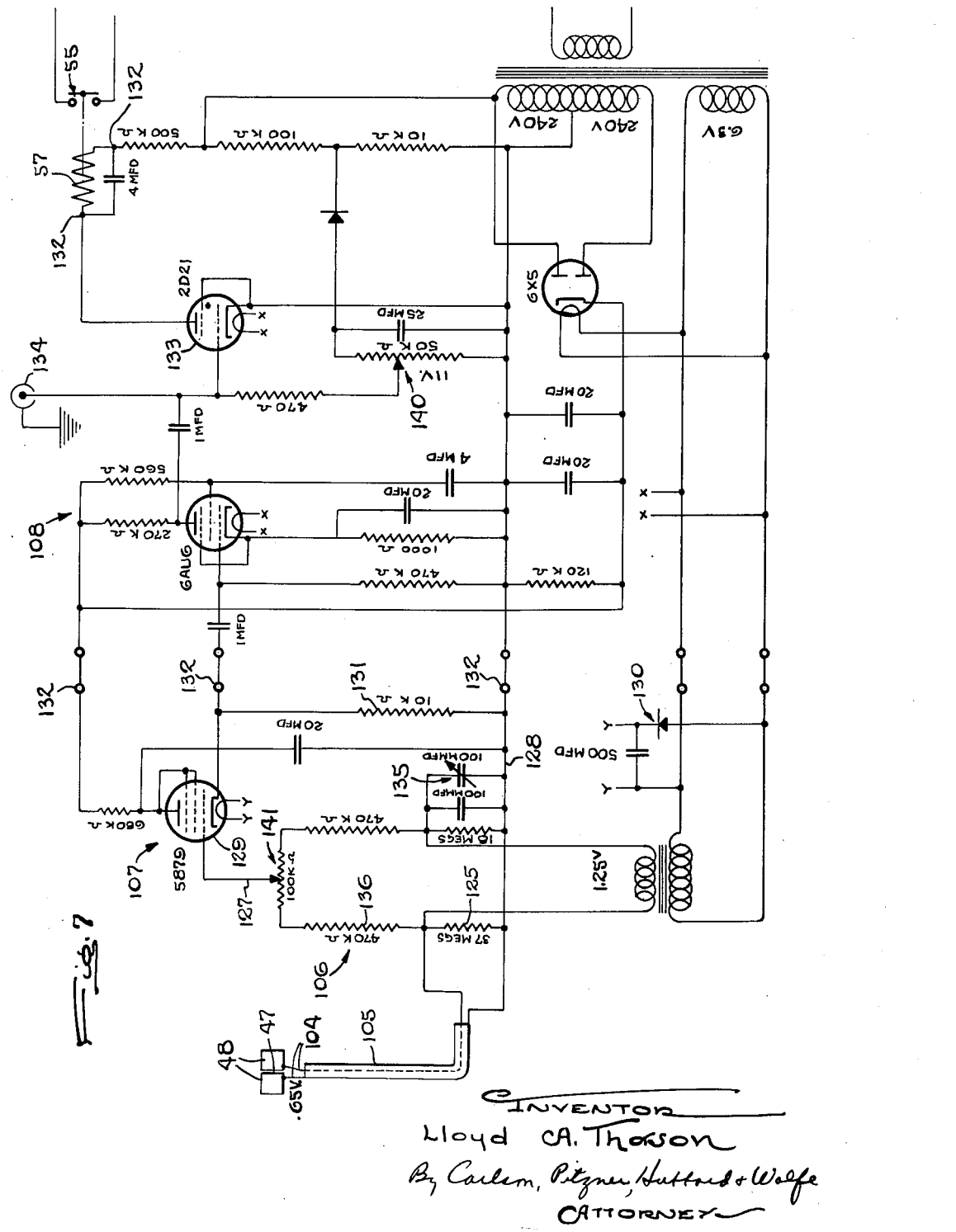

United States Patent Office 3,031,881
Patented May 1, 1962

3,031,881
APPARATUS FOR MEASURING CARBON POTENTIAL
Lloyd A. Thorson, Belvidere, Ill., assignor to Ipsen Industries, Inc., Rockford, Ill., a corporation of Illinois
Filed Dec. 24, 1958, Ser. No. 782,953
4 Claims. (Cl. 73—17)

This invention relates to an apparatus for automatically and continuously determining the carbon potential of the atmosphere in a heat treating furnace by measuring the dew point temperature of a portion of said atmosphere withdrawn from the furnace chamber. The invention has more particular reference to systems in which the dew point measurement involves the cooling of the withdrawn sample to the prevailing dew point temperature so as to condense moisture out of the sample.

The primary object is to provide a carbon potential measuring and control system of the above character which, as compared to prior systems, is more accurate and reliable and better adapted to operate uniformly throughout long periods of service use.

In certain of its aspects, the invention involves the general method and apparatus disclosed in Patent No. 2,815,305, in which a sample of the furnace gas is passed over spaced electrodes alternately heated above and cooled to the temperature at which moisture condenses from the sample and the electrodes are interposed in a circuit for measuring the impedance across the electrode gap as an indication of the prevailing dew point of the gas.

Another object is to condition the furnace gas sample in a novel manner such as to avoid falsification of the impedance measurement.

Other objects and advantages of the invention will become apparent from the following detailed description taken in connection with the accompanying drawings, in which—

FIG. 7 is a wiring diagram of the complete dew point measuring circuit.

Figure 1:
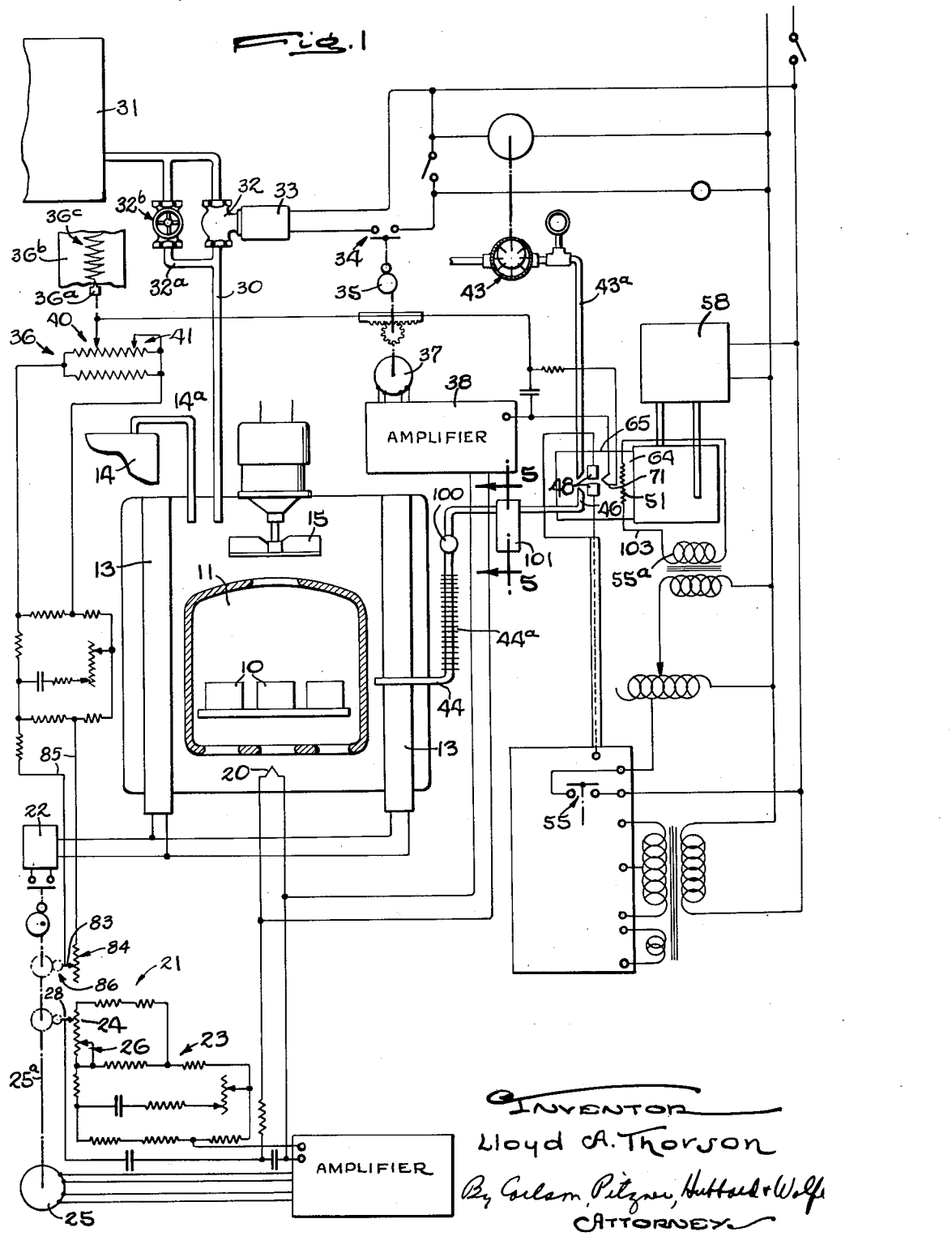
FIGURE 1 is a schematic view and circuit diagram of an apparatus for carrying out the invention in its various aspects.

In the drawings, the invention in its various aspects is embodied in a system of the type disclosed in the aforesaid patent for measuring and controlling the dew point temperature of the gaseous atmosphere in a heat treating furnace. Accordingly and to facilitate comparison with the patented system, the reference numerals of the patent are used on those parts common to the patented and the present system.

During carburizing, carbon nitriding or other heat treatment, the workpieces 10 are mounted in a muffle chamber 11 heated to the proper temperature by suitable gas or electric heaters 13 and filled with the gas of suitable composition for the treatment desired. For carburizing, this gas is usually supplied from a suitable gas generator 14 and preferably delivered continuously into the furnace through a pipe 14ª, some of the gas being permitted to escape continuously from the chamber 11 in which the gas is maintained in motion by a motor driven fan 15. A suitable generator for this purpose is the No. 500E endothermic generator manufactured by Ipsen Industries, Inc. of Rockford, Illinois.

The carrier gas delivered by the generator 14 is the product of a catalytic reaction of air and fuel gas and includes various proportions of carbon dioxide, carbon monoxide, hydrogen, nitrogen, methane, and water vapor. In carburizing, for example, the generator is usually adjusted to produce a relatively lean mixture in respect to the reaction between the gas and the work and to add proper amounts of a hydocarbon gas for carbon control. For various reasons, including the reactions which occur between the gas constituents and the work in the chamber 11, there is usually an increase in the dew point of the chamber atmosphere which dew point may be reduced by increasing the hydrocarbon constituents of the gas supplied to the chamber. By regulating the admission of the hydrocarbon gas, it is possible to control the dew point within the chamber and thus produce conditions conducive to the desired treatment of the work.

The patented method of regulating the furnace dew point includes the steps of continuously withdrawing part of the gas from the muffle 11, measuring the dew point thereof, and in response to a deviation of the latter from a predetermined range or value, varying the constituency of the gas admitted to the furnace chamber in a direction to reestablish the proper moisture content. By thus maintaining the atmosphere at a substantially constant dew point, a uniform carbon potential for a given treating temperature will be achieved. To further improve the uniformity of carbon transfer and permit heating at different selected temperatures, the invention contemplates a novel method of correlating the dew point regulation with such temperature changes so that any desired carbon potential may be selected and maintained with a high degree of uniformity under all conditions of service operation.

To regulate the furnace temperature, the supply of energy to the heaters 13 is governed by a suitable controller 21 of well known construction adapted to turn the heaters on and off in response to closure and opening of a switch 22. Changes in the furnace temperature are sensed by a thermocouple 20 and produce a voltage signal which, in accordance with well known heat treating practice, is impressed on the input of a normally balanced network or bridge 23 including a balancing potentiometer 24 actuated from a shaft 25ª which is driven by a reversible electric motor 25, the selection of different temperatures to be maintained in the furnace being made by adjusting a control potentiometer 26. An instrument suitable for this purpose is a Brown Instrument electronic recording controller known as 153C10.

While the dew point of the atmosphere in a carburizing furnace may be varied in other ways as by adjusting the operation of the generator 14, it is preferable to increase or decrease the admission of a gaseous medium containing hydrocarbons such as propane which, at the usual heat treating temperatures, are unstable and unite with the moisture to form carbon monoxide and hydrogen thus reducing the dew point and correspondingly increasing the carbon potential of the carburizing atmosphere. The dew point regulating medium, which may be natural gas, is delivered from a source 31 through a pipe 30 leading to the furnace chamber 11, the flow being increased and decreased by opening and closing of a valve 32 actuated by a solenoid 33 in response to closure of a switch 34. A very small flow of the dew point controlling gas is introduced continuously into the furnace chamber as through a normally open by-pass 32ª adjusted by a valve 32ᵇ so that the flow is only a small fraction of the rate at which the primary carburizing gas from the generator 14 is supplied to the furnace. By opening the valve 32, the supply of the secondary gas is increased substantially.

The valve control switch 34 is actuated by a cam 35 on the output shaft of an electronic recording controller 36 of the same construction as the unit 23 above described. As before, this controller includes a reversible motor 37 energized from an amplifier 38 and drives the cam 35 as well as the slider of the balancing potentiometer 40, the control point of this network being varied by adjusting the slider of a potentiometer 41. In such controllers, the balancing motor is also coupled to a stylus 36a (FIG. 1) movable back and forth across a continuously advancing chart 36b so as to make a record 36c of changes in the controlling condition.

A voltage signal corresponding in magnitude to the prevailing dew point of the furnace atmosphere is derived from a mechanism which continuously samples the atmosphere, alternately cools and heats the sample, and measures the temperature at which condensation occurs, this being the dew point temperature. For these purposes, the gas sample is cooled to a substantially uniform temperature in being conducted outside of the furnace to a chamber 64 enclosed by a housing 65 so that the flow of the gas therein is not affected by outside air disturbances. Herein, withdrawal of the gas sample is effected by a motor driven vacuum pump 43 communicating with the chamber 64 through a pipe 43a, the sample after being used escaping from the pump outlet. Under the vacuum created within the chamber 64 during operation of the pump, gas is withdrawn from the furnace chamber 11 and passed through a pipe 44 having fins 44a or other means for cooling the gas to a temperature of less than 130 deg. F. The pipe also includes a mechanical filter 100 and a device 101 for removing certain contaminants as later described before the gas is delivered into the chamber 64. Such delivery is through a nozzle 46 properly shaped to discharge a jet or stream of a desired pattern onto the exposed surfaces of two electrodes 48 whose adjacent straight edges 48a define a narrow gap which in the present instance is .015 of an inch wide and 5/16 of an inch long. The electrodes and the gap are visible through a window 65a in the housing 65.

Figure 3:
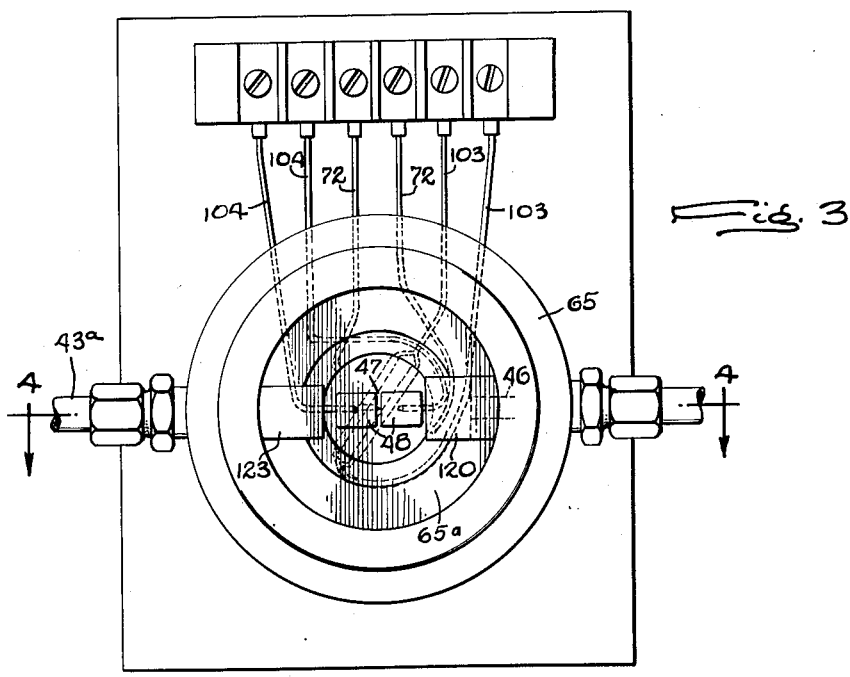
FIG. 3 is a face view of the sensing head.
Figure 4:
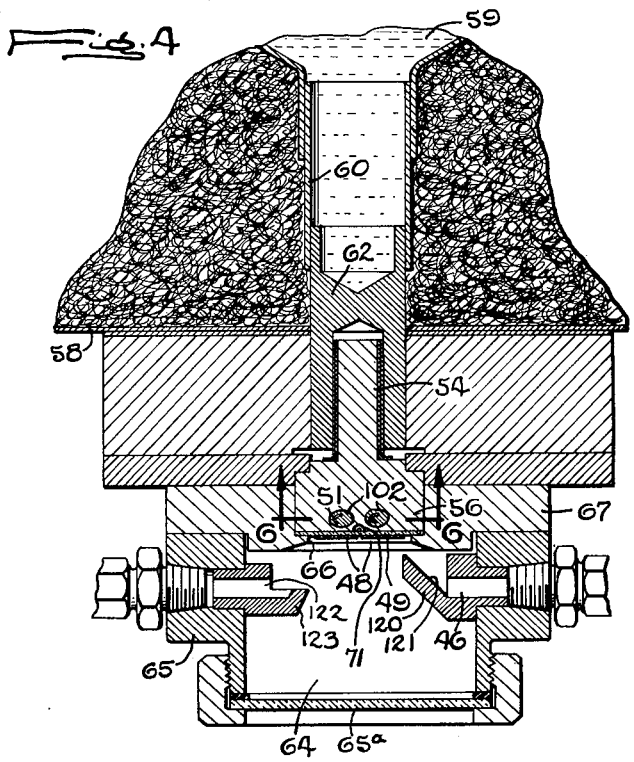
FIG. 4 is a fragmentary section taken along the line 4—4 of FIG. 3.
Figure 6:
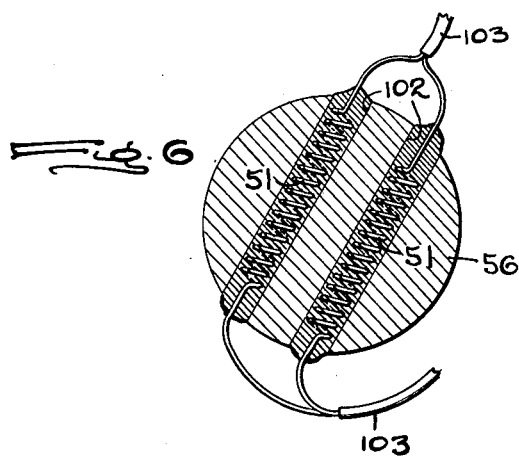
FIG. 6 is a fragmentary section taken along the line 6—6 of FIG. 4.

As shown in FIGS. 3, 4 and 6, the electrodes comprise thin preferably rectangular plates .001 of an inch thick of metal such as platinum foil cemented onto a thin plate 49 (.006 of an inch thick) of nonconducting material such as glass which in turn is fastened flat against one side of a block 56 of good heat conducting material such as copper mounted in a plate 67 forming one wall of the housing 65 and having an opening 66 through which the electrodes are exposed. Insulated conductors 104 connected to the electrodes extend outwardly and laterally through holes in the plate and the block which is about one inch in diameter and 5/16 of an inch thick.

A short distance behind the electrodes plates 48 transverse holes 102 are bored through the block 56 and receive electric heaters 51 (FIG. 6) held in the holes by suitable filling material. Herein, the heaters take the form of coils of resistance wire paralleling each other and extending diagonally across the backs of the electrodes. The coils are connected in parallel and their leads 103 are extended to terminals mounted on the outside of the chamber housing 65 and adapted to be energized from a current source 55a upon closure of a switch 55 actuated by a relay 57 (FIG. 7). In a similar way, leads 104 connected to the centers of the electrodes are extended outwardly through the housing 65 and, as shown in FIG. 3, are spaced a substantial distance laterally and away from the heater leads 103.

The capacity of the heaters to raise the temperature of the electrodes 48 is substantially greater than the cooling capacity of a refrigerating device 58 also arranged in heat conducting relation with respect to the block 56 and capable of cooling the electrodes 48 below the lowest dew point temperature which the furnace atmosphere ever attains. This device preferably comprises a motor driven compressor unit 58 (FIG. 1) of well known construction for liquifying a refrigerant 59 (FIG. 4) which is vaporized in a casing 60. One end portion of the latter encloses one end of a rod 62 of heat conducting metal, the other rod end receiving the stem 54 of the block 56 and thus being maintained in heat conducting relation with respect to the latter.

It will be apparent that as the electrodes 48 are cooled progressively by the refrigerating device above described, moisture will condense out of the gas stream in and around the gap 47 at the prevailing dew point temperature of the gas. This condition is detected by a thermocouple 71 which measures the temperature of the block 56 and impresses a corresponding signal on the controller or network 36. The thermocouple junction is embedded in the block 56 closely adjacent the gap 47 immediately behind the plate 49. Conductors 72 connect the thermocouple terminals to the input of the network 36 on which the voltage generated by the thermocouple is impressed continuously. As shown in FIG. 3, these conductors are spaced laterally from each other and also from the conductors 103 and 104.

Figure 2:
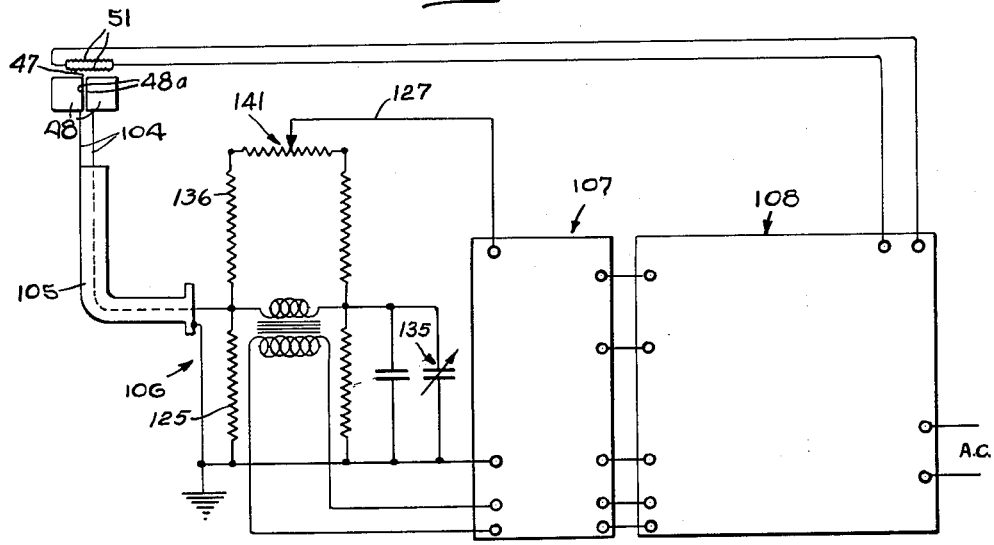
FIG. 2 is a diagram of the circuit for controlling the electric heaters of the dew point measuring head.

In accordance with one aspect of the invention, the presence of such moisture is detected by utilizing the gap 47 as an impedance element associated with an electrical bridge network 106 whose output is changed in response to the presence and absence of moisture in the gap 47. This output is impressed on a well known cathode follower unit 107 (FIGS. 2 and 7) which transfers the signal to a low impedance circuit by which the signal is applied to a high gain amplifier 108 controlling the energization and deenergization of the relay 57 for actuating the switch 55 to alternately close and open the circuit for energizing the heaters 51. The arrangement is such that when the temperature of the electrodes 48 is above the prevailing dew point temperature of the gas sample being delivered to the chamber 64 and there is no condensation or mist in the gap 47, the optimum impedance thus offered thereby causes the relay 57 and therefore the heaters 51 to remain deenergized. When such condensation does occur reducing the gap impedance appreciably, the action of the bridge 106 is modified to effect energization of the relay to close the switch 55 and again activate the heaters.

The effective capacity of the heaters 51 is substantially greater than the cooling capacity of the refrigerating device 57 so that within a short interval, usually about one second, the temperature of the electrodes 48 and the gap 47 will have been raised above the prevailing dew point temperature of the furnace atmosphere thereby causing the mist like condensate within the gap to disappear by evaporation. The resulting increase in the gap impedance and change in the balance of the bridge 106 closes the relay 57 and the heaters 51 to again be deenergized. This initiates the cooling part of another cycle and after a second interval, moisture will again start to condense in the gap 47 causing a sharp drop in the control impedance and deenergization of the heaters 51 as a consequence.

By properly correlating the capacities of the heaters 51 and the refrigerating device 58 and by enclosing the gap 47 and directing the gas sample directly onto the latter in the manner described above, it is possible to so shorten the heating and cooling cycles that the temperature of the block 56 varies only a few degrees, for example three degrees Fahrenheit. Thus, the thermocouple 71 senses the average temperature of the block and imposes on the network 36 a temperature signal which remains fairly constant and represents an accurate measure of the prevailing dew point of the furnace atmosphere.

When the carbon potential of the furnace atmosphere as contrasted with the dew point only is to be measured, means are provided for impressing on the input of the network 36 a signal which corresponds to and varies with changes in the furnace temperature. Also, this temperature may be varied under manual control by adjusting the potentiometer 26 and therefore the control point of the instrument. Since the position of the driven shaft 25ª of the controller corresponds at all times to the prevailing furnace temperature, it is utilized to provide a temperature compensating signal which is added to and thus combined with the dew point signal to provide the input of the controller 36. This may be accomplished by coupling, as through suitable gearing 86, the shaft 28 to the slider 83 of a potentiometer 84 so as to provide a voltage across conductors 85 connected to the input of the network 36 including the amplifier 38. As the furnace temperature increases and decreases, the slider 83 will move to increase and decrease the compensating voltage and correspondingly affect the position of the driven element 39 of the controller 36 for any given value of the dew point. Thus, the action of the latter, although governed primarily by the dew point signal, is modified by changes in the furnace temperature so as to produce a resultant control motion which is a true measure of the carbon potential of the furnace atmosphere. That is to say, the driven element or slider 39 of the network 36 occupies at all times a position corresponding to the prevailing carbon potential of the furnace gas. By coupling the slider of the potentiometer 40 to a stylus 36ª, the prevailing value of the carbon potential of the furnace atmosphere will be recorded at 36ᶜ along a chart 36ᵇ of the recorder.

In actual service, the patented system failed to provide uniformity and accuracy desired in the measurement of the dew point during prolonged operation and under the varying conditions encountered in different installations. I have discovered several causes for such failure. One of these is the presence in the sample gas stream of certain contaminants which during the cooling of the gas become deposited on the sensing elements, the gap 47 and the electrodes 48 are precipitated in the adjacent zone of the chamber 64. These materials hold moisture or otherwise cause the impedance of the gap 47 to be changed so materially as to preclude alternate condensation and evaporation of the moisture on the electrodes and in and adjacent the gap 47 in the manner required for making accurate measurements.

The contaminants thus contributing to such false measurements are numerous hydrocarbons which are by-products resulting from the breakdown of the constituents of natural gas in the heat treating furnace itself, such breakdown probably being accelerated by a catalytic action caused by the metal of the work itself or the nichrome or other non-ferrous metal of which the baskets frequently used for holding the workpieces are usually made. Among the gases believed to be present in the sample gas as delivered to the sensing chamber 64 are anthracene, penthrazene and napthalene, the latter having been identified as the major one of the objectionable constituents in most installations. These gases sublime when cooled in the chamber 64 to the dew point temperature and have been found in some instance to accumulate as a coating on the electrodes and across the gap 47.

In accordance with one of its aspects, the present invention aims to remove substantially all of these objectionable contaminants by bringing the gas sample before it enters the chamber 64 into contact with a material which will absorb or dissolve and retain the naphthalene or other contaminants without at the same time changing the moisture content of the gas. To this end, the solvent should possess a low vapor pressure and not react in any way with the moisture carried by the gas.

Among the materials presently available and found to satisfy the foregoing requirements are numerous liquids including tricresyl phosphate, dibutyl phthalate, Flexol 3GO made by Union Caribide and identified as triethylene glycol, di-2-ethyl-hexoate, Flexol DOP also sold by Union Carbide, mon-amyl-naphthalene-pentalene 95, di-amyl naphthalene-pentalene 195, di-iso-decyl phthalate and di-iso-octyl phthalate. Triphenylphosphate which is a solid at ordinary temperatures has also been found to be particularly useful. Tricresyl phosphate is especially suited for scrubbing the gas sample when, as in many installations, naphthalene constitutes the predominating contaminant to be removed. Other of the above chemicals are more effective in removing other contaminants present in smaller quantities. Accordingly, the liquid preferably used in a given heat treating installation will depend on the composition of the gas being employed as the furnace atmosphere and in most instances will probably be a combination of the chemicals above mentioned proportioned in accordance with the conditions existing in the particular installation.

Figure 5:
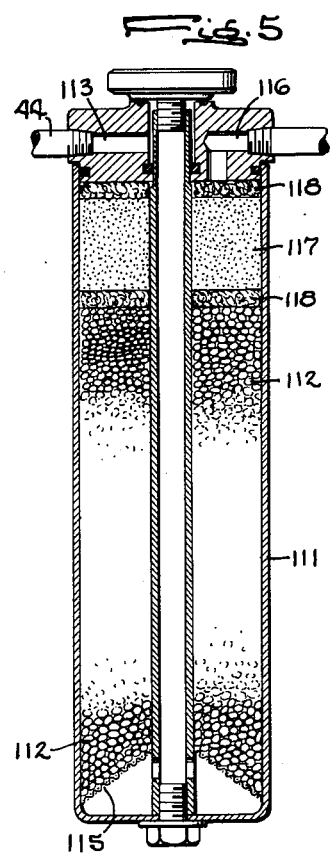
FIG. 5 is a fragmentary section taken along the line 5—5 of FIG. 1.

The solvent or absorbent for the contaminating gases is best brought into intimate scrubbing contact with the sample gas by distributing the liquid over the surface of pellets 112 arranged in a column in a tank 111 (FIGS. 1 and 5) interposed in the pipe 44. Preferably the pellets are composed of so-called tabular or bubble alumina which has not been activated. The sample gas enters an inlet 113 at the top of the tank and after passing down through a tube 114 flows through a screen 115 and then upwardly through the pellet bed and finally to an outlet 116. In passing through the voids in the pellet bed, the gas is scrubbed effectually by contact with the solvent and virtually all of the objectionable contaminants are usually removed.

It has been found that a more thorough cleansing of the sample gas and removal of the last traces of the objectionable contaminants may be achieved by passing the scrubbed gas through a bed 117 of fine granulated filtering material capable of absorbing non-aqueous constituents of the gas and without changing the moisture content of the gas. Deactivated carbon such as finely granulated bituminous coal has been found particularly effective in such final cleansing of the gas sample. This material is preferably arranged in the form of a shallow bed disposed above the scrubbing bed 112, the material being held between layers 118 of fiberglass or other filter fabric.

The service life of the scrubbing unit 101 may be prolonged by mechanically filtering suspended solids out of the sample gas stream in advance of the unit 101. This may be accomplished by a filter of standard construction adapted to remove all particles larger than five microns.

In the measuring circuit shown herein, alternating current of relatively low voltage, for example .65 of a volt, is impressed across the electrodes 48 and the impedance, that is, the capacitance as well as the resistance across the gap 47 is measured. The circuit comprises the bridge network 106, the cathode follower 107 and the high gain amplifier 108. Typical values of the various elements of this network are indicated in FIG. 7.

The electrodes 48 are connected in parallel with the leg 125 of the bridge 106 having a resistance value approximately equal to the impedance of the gap 47. By impressing an alternating voltage of suitable value across the junctions 126 of the bridge elements shown, the resulting voltage across the gap being below the ionization point above referred to, for example .65 of a volt.

It will be apparent that a circuit of the above character is very sensitive to extraneous electrical influences. To minimize the effects of these, the conductors 104 are spaced as far as possible away from the heater and thermocouple leads as shown in FIG. 3 and outside of the sensing head the conductors 104 take the form of a coaxial cable 105. Also, the output of the bridge appearing at the terminals 127, 128 is impressed on the tube 129 of the cathode follower 107 which is of well known construction and energized by direct current from a rectifier 130 and with the elements of the follower arranged as shown in FIG. 7.

As is well understood in the art, the follower is well shielded and operates without amplification, distortion, or change in phase to reproduce in a low impedance circuit the signals received from the high impedance bridge circuit. The signals are thus rendered usable for energizing the input of the high gain amplifier. Accordingly, the terminals 132 of the follower unit are connected to the input terminals of the amplifier 108. The latter is of well known construction having elements of the values shown in FIG. 7. The output terminals 132 of the thyratron 133 are connected across the coil of the relay 57.

The arrangement of the circuit and the adjustment of its parts is such that when moisture in the form of a mist starts to appear in the gap 47 and the accumulation is sufficient to decrease the impedance to a predetermined value which may be 34 megohms, the voltage applied to the thyratron grid is increased sufficiently to overcome the bias and fire the tube thus energizing the relay 57 to close the switch 55. This energizes the heaters 51 to initiate the heating part of the cycle. As the moisture particles disappear, the gap impedance increases until at a value, for example 36 megohms, slightly higher than the trip point of the cooling cycle, the voltage applied to the thyratron will decrease sufficiently to cut out the tube and thereby cause the relay 57 to be deenergized. Another cooling cycle in the measuring head is thus started and alternate cooling and heating cycles are repeated continuously.

Proper calibration of the circuit for effecting energization and deenergization of the relay 57 at the desired values of the impedance of the gap 47 may be achieved by substituting for the gap 47 and associated parts a test impedance having the same combined resistance and capacity reactance as the dew point sensing unit at the trip point desired. The circuit adjustments are made while observing a suitable oscilloscope connected into the circuit at 134. First, the variable capacitance 135 is adjusted to balance the resistance against the test impedance while establishing the proper phase relationship with the alternating current supply. The voltage required for properly biasing the thyratron is obtained by adjustment of the potentiometer 140. The desired amplitude of the signal supplied to the amplifier 108 is produced by adjustment of the potentiometer 141.

I claim as my invention:

1. Apparatus for measuring the dew point of a hydrocarbon atmosphere in the chamber of a heat treating furnace comprising, in combination, a device for measuring and indicating the dew point of a gas including means for cooling the gas delivered thereto to a temperature below the prevailing dew point temperature of the gas, means for continuously drawing a sample of said gas from said chamber and passing the same through said device, and means interposed in the path of the sample stream between said chamber and said device for scrubbing the gas and removing therefrom contaminants which will condense at said cooling temperature.

2. Apparatus as defined by claim 1 in which said scrubbing means includes a material capable of absorbing said contaminants and having a vapor pressure sufficiently low to maintain the moisture content of said gas.

3. Apparatus as defined by claim 1 in which said scrubbing means includes a material capable of dissolving naphthalene and having a low vapor pressure.

4. In an apparatus for measuring the dew point of a hydrocarbon gas in the work chamber of a heat treating furnace, the combination of, a scrubbing chamber containing a medium capable of removing from gas passed therethrough any constituents which sublime at a temperature below the dew point of the gas, a sensing cell including a chamber adapted to be cooled below said dew point temperature, and means for withdrawing a sample stream of said gas from said work chamber and flowing the same continuously first through said scrubbing chamber and then through said sensing chamber.

References Cited in the file of this patent

UNITED STATES PATENTS

| | | |
|---|---|---|
| 1,379,266 | Keeler | May 24, 1921 |
| 1,578,687 | Sperr | Mar. 30, 1926 |
| 2,037,317 | Fenske | Apr. 14, 1936 |
| 2,522,348 | Dahline | Sept. 12, 1950 |
| 2,607,223 | Fleming | Apr. 19, 1952 |
| 2,815,305 | Ipsen | Dec. 3, 1957 |